(12) United States Patent
Li

(10) Patent No.: US 6,507,614 B1
(45) Date of Patent: Jan. 14, 2003

(54) EFFICIENT DE-QUANTIZATION IN A DIGITAL VIDEO DECODING PROCESS USING A DYNAMIC QUANTIZATION MATRIX FOR PARALLEL COMPUTATIONS

(75) Inventor: Wei-Jen Li, Fremont, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/421,782

(22) Filed: Oct. 19, 1999

(51) Int. Cl.[7] ................................................. H04N 7/12
(52) U.S. Cl. .................................. 375/240.03; 708/402
(58) Field of Search ....................... 375/240.02, 240.03, 375/240.04, 240.05, 240.06, 240.07; 382/251; 708/203, 400, 402; 348/384.1

(56) References Cited

U.S. PATENT DOCUMENTS 5,748,791 A * 5/1998 Park ........................... 382/250
5,825,970 A * 10/1998 Kim ........................... 386/109

* cited by examiner

Primary Examiner—Chris Kelley
Assistant Examiner—George A Bugg

(74) Attorney, Agent, or Firm—Wagner Murabito & Hao LLP

(57) ABSTRACT

An efficient digital video (DV) decoder process that utilizes a specially constructed quantization matrix allowing an inverse quantization subprocess to perform parallel computations, e.g., using SIMD processing, to efficiently produce a matrix of DCT coefficients. The present invention utilizes a first look-up table (for 8×8 DCT) which produces a 15-valued quantization scale based on class number information and a QNO number for an 8×8 data block ("data matrix") from an input encoded digital bit stream to be decoded. The 8×8 data block is produced from a deframing and variable length decoding subprocess. An individual 8-valued segment of the 15-value output array is multiplied by an individual 8-valued segment, e.g., "a row," of the 8×8 data matrix to produce an individual row of the 8×8 matrix of DCT coefficients ("DCT matrix"). The above eight multiplications can be performed in parallel using a SIMD architecture to simultaneously generate a row of eight DCT coefficients. In this way, eight passes through the 8×8 block are used to produce the entire 8×8 DCT matrix, in one embodiment consuming only 33 instructions per 8×8 block. After each pass, the 15-valued output array is shifted by one value position for proper alignment with its associated row of the data matrix. The DCT matrix is then processed by an inverse discrete cosine transform subprocess that generates decoded display data. A second lookup table can be used for 2×4×8 DCT processing.

20 Claims, 16 Drawing Sheets

300

| CLASS NUMBER | | | DCT BLOCK | |
|---|---|---|---|---|
| | C1 | C0 | QUANTIZATION NOISES | MAXIMUM ABSOLUTE VALUE OF AC COEFFICIENTS |
| 0 | 0 | 0 | VISIBLE | LESS THAN OR EQUAL TO 255 |
| 1 | 0 | 1 | LOWER THAN CLASS 0 | |
| 2 | 1 | 0 | LOWER THAN CLASS 1 | |
| 3 | 1 | 1 | LOWER THAN CLASS 2 | |
| | | | | GREATER THAN 255 |

| | MAXIMUM ABSOLUTE VALUE OF AC COEFFICIENTS | | | |
|---|---|---|---|---|
| | 0 TO 11 | 12 TO 23 | 24 TO 35 | >35 |
| Y | 0 | 1 | 2 | 3 |
| CR | 1 | 2 | 3 | 3 |
| CB | 2 | 3 | 3 | 3 |

8-8-DCT
HORIZONTAL →

VERTICAL ↓

|   | 0 | 1 | 2 | 3 | 4 | 5 | 6 | 7 |
|---|---|---|---|---|---|---|---|---|
| 0 | DC | 0 | 0 | 1 | 1 | 1 | 2 | 2 |
| 1 | 0 | 0 | 1 | 1 | 1 | 2 | 2 | 2 |
| 2 | 0 | 1 | 1 | 1 | 2 | 2 | 2 | 3 |
| 3 | 1 | 1 | 1 | 2 | 2 | 2 | 3 | 3 |
| 4 | 1 | 1 | 2 | 2 | 2 | 3 | 3 | 3 |
| 5 | 1 | 2 | 2 | 2 | 3 | 3 | 3 | 3 |
| 6 | 2 | 2 | 2 | 3 | 3 | 3 | 3 | 3 |
| 7 | 2 | 2 | 3 | 3 | 3 | 3 | 3 | 3 |

2-4-8-DCT
HORIZONTAL →

(SUM)

VERTICAL (DIFFERENCE)

|   | 0 | 1 | 2 | 3 | 4 | 5 | 6 | 7 |
|---|---|---|---|---|---|---|---|---|
| 0 | DC | 0 | 1 | 1 | 1 | 2 | 2 | 3 |
| 1 | 0 | 1 | 1 | 2 | 2 | 2 | 3 | 2 |
| 2 | 1 | 1 | 2 | 2 | 2 | 3 | 3 | 3 |
| 3 | 1 | 2 | 2 | 2 | 3 | 3 | 3 | 3 |
| 4 | 0 | 0 | 1 | 1 | 2 | 2 | 2 | 3 |
| 5 | 0 | 1 | 1 | 2 | 2 | 2 | 3 | 3 |
| 6 | 1 | 1 | 2 | 2 | 2 | 3 | 3 | 3 |
| 7 | 1 | 2 | 2 | 3 | 3 | 3 | 3 | 3 |

| | CLASS NUMBER 374 | | | | AREA NUMBER 376 | | | |
|---|---|---|---|---|---|---|---|---|
| | 0 | 1 | 2 | 3 | 0 | 1 | 2 | 3 |
| QUANTIZATION NUMBER (QNO) 372 | 15 | | | | 1 | 1 | 1 | 1 |
| | 14 | | | | 1 | 1 | 1 | 1 |
| | 13 | | | | 1 | 1 | 1 | 1 |
| | 12 | 15 | | | 1 | 1 | 1 | 1 |
| | 11 | 14 | | | 1 | 1 | 1 | 1 |
| | 10 | 13 | | 15 | 1 | 1 | 1 | 1 |
| | 9 | 12 | 15 | 14 | 1 | 1 | 1 | 1 |
| | 8 | 11 | 14 | 13 | 1 | 1 | 1 | 2 |
| | 7 | 10 | 13 | 12 | 1 | 1 | 2 | 2 |
| | 6 | 9 | 12 | 11 | 1 | 1 | 2 | 2 |
| | 5 | 8 | 11 | 10 | 1 | 2 | 2 | 4 |
| | 4 | 7 | 10 | 9 | 1 | 2 | 2 | 4 |
| | 3 | 6 | 9 | 8 | 2 | 2 | 4 | 4 |
| | 2 | 5 | 8 | 7 | 2 | 2 | 4 | 4 |
| | 1 | 4 | 7 | 6 | 2 | 4 | 4 | 8 |
| | 0 | 3 | 6 | 5 | 2 | 4 | 4 | 8 |
| | | 2 | 5 | 4 | 4 | 4 | 8 | 8 |
| | | 1 | 4 | 3 | 4 | 4 | 8 | 8 |
| | | 0 | 3 | 2 | 4 | 8 | 8 | 16 |
| | | | 2 | 1 | 4 | 8 | 8 | 16 |
| | | | 1 | 0 | 8 | 8 | 16 | 16 |
| | | | 0 | | 8 | 8 | 16 | 16 |

```
HALFWORD q_table_8x8 [Q_TYPES] [16] = {
   8,  4,  4,  2,  2,  1,  1,  1,
   8,  4,  4,  2,  2,  1,  1,  1,
   8,  8,  4,  4,  2,  2,  1,  1,
   8,  8,  4,  4,  2,  2,  1,  1,
   8,  8,  4,  4,  2,  2,  1,  1,
  16,  8,  8,  4,  4,  2,  2,  1,
  16,  8,  8,  4,  4,  2,  2,  1,
  16, 16,  8,  8,  4,  4,  2,  2,
  16, 16,  8,  8,  4,  4,  2,  2,
  16, 16,  8,  8,  4,  4,  2,  2,
  16, 16,  8,  8,  4,  4,  2,  2,
  16, 16,  8,  8,  4,  4,  2,  2,
  16, 16,  8,  8,  4,  4,  2,  2,
  NULL, NULL, NULL, NULL, NULL, NULL, NULL
};
```

```
HALFWORD q_table_2x4X8 [Q_TYPES] [16] = {
    8,  4,  4,  2,  2,  1,  1,  1,
    8,  8,  4,  4,  2,  2,  1,  1,
    8,  8,  4,  4,  2,  2,  1,  1,
   16,  8,  8,  4,  4,  2,  2,  1,
   16,  8,  8,  4,  4,  2,  2,  1,
   16,  8,  8,  4,  4,  2,  2,  1,
   16, 16,  8,  8,  4,  4,  2,  2,
   16, 16,  8,  8,  4,  4,  2,  2,
   16, 16,  8,  8,  4,  4,  2,  2,
   16, 16,  8,  8,  4,  4,  2,  2,
   NULL, NULL, NULL, NULL, NULL, NULL, NULL, NULL,
   NULL, NULL, NULL, NULL, NULL, NULL, NULL, NULL,
   NULL, NULL, NULL, NULL, NULL, NULL, NULL, NULL,
   NULL, NULL, NULL, NULL, NULL, NULL, NULL, NULL,
   NULL, NULL, NULL, NULL, NULL, NULL, NULL, NULL,
   NULL, NULL, NULL, NULL, NULL, NULL, NULL, NULL,
};
```

| COMPRESSED MACRO BLOCK NUMBER | | | | BYTE POSITION NUMBER | | | |
|---|---|---|---|---|---|---|---|
| | 5 | 6 —— 20 | —— 34 —— | 48 —— | 62 —— | 72 —— 81 | |
| CM a, 2, k | S T A R T<br>a Q N 0 a s | Fa, 2, k, 0 | Fa, 2, k, 1 | Fa, 2, k, 2 | Fa, 2, k, 3 | Fa, 2, k, 4 | Fa, 2, k, 5 |
| CM b, 1, k | S T A R T<br>e Q N 0 b s | Fb, 1, k, 0 | Fb, 1, k, 1 | Fb, 1, k, 2 | Fb, 1, k, 3 | Fb, 1, k, 4 | Fb, 1, k, 5 |
| CM c, 3, k | S T A R T<br>c Q N 0 c s | Fc, 3, k, 0 | Fc, 3, k, 1 | Fc, 3, k, 2 | Fc, 3, k, 3 | Fc, 3, k, 4 | Fc, 3, k, 5 |
| CM d, 0, k | S T A R T<br>d Q N 0 d s | Fd, 0, k, 0 | Fd, 0, k, 1 | Fd, 0, k, 2 | Fd, 0, k, 3 | Fd, 0, k, 4 | Fd, 0, k, 5 |
| CM e, 4, k | S T A R T<br>e Q N 0 e | Fe, 4, k, 0 | Fe, 4, k, 1 | Fe, 4, k, 2 | Fe, 4, k, 3 | Fe, 4, k, 4 | Fe, 4, k, 5 |
| | | Y0<br>14 BYTES | Y1<br>14 BYTES | Y2<br>14 BYTES | Y3<br>14 BYTES | CR<br>10 BYTES | CB<br>10 BYTES |

WHERE
$a = (1+2) \mod n$
$b = (1+6) \mod n$
$c = (1+8) \mod n$
$d = (1+0) \mod n$
$e = (1+4) \mod n$ $l$: the vertical order of the super block
 $l = 0, ..., n-1$
$n$: the number of vertical super blocks in a video frame
 $n = 10$ for 525-60 system
 $n = 12$ for 625-50 system
$k$: the macro block order in the super block
 $k = 0, ..., 26$

FIGURE 12A

EFFICIENT DE-QUANTIZATION IN A DIGITAL VIDEO DECODING PROCESS USING A DYNAMIC QUANTIZATION MATRIX FOR PARALLEL COMPUTATIONS

BACKGROUND OF THE INVENTION

1. Field of the Invention

The present invention relates to the field of computer controlled multi-media audio visual display. More specifically, the present invention relates to an efficient decoding process for decoding audio/video material represented as a digital bit stream encoded using the Digital Video (DV) standard.

2. Related Art

Audio/visual (AV) material is increasingly stored, transmitted and rendered using digital data. Digital video representation of AV material facilitates its usage with computer controlled electronics and also facilitates high quality image and sound reproduction. Digital AV material is typically compressed ("encoded") in order to reduce the computer resources required to store and transmit the digital data. Digital AV material can be encoded using a number of well known standards including, for example, the DV (Digital Video) standard, the MPEG (Motion Picture Expert Group) standard and the JPEG standard. The encoding standards also specify the associated decoding processes as well.

The DV decoding process includes a sub-step called "inverse quantization" which is also called "de-quantization." Inverse quantization is a difficult part of the DV decoding process because the inverse quantization table that is used in DV decoding is not a pre-loaded matrix, as in MPEG decoding. Therefore, the quantization matrix used in DV decoding needs to be computed for each new 8×8 pixel (or "data") block.

For example, FIG. 1 illustrates a step in the inverse quantization process of a DV decoder. For 8×8-DCT (Discrete Cosine Transform) mode, an input 8×8 block of data 10 is multiplied by an 8×8 quantization matrix 20 to produce an 8×8 DCT matrix of coefficients 30. Each X coefficient (or "pixel") of matrix 10 is multiplied by its associated Q coefficient of matrix 20 to produce a resultant coefficient in the 8×8 DCT matrix 30. The 8×8 DCT matrix 30 is the output of the inverse quantization of the input pixel block 10. However, each quantization coefficient (Qij) for each associated pixel (Xij) in the 8×8 matrix 10 is dynamically calculated based on certain parameters thereby making this computation very difficult to implement in a SIMD (Single Instruction Multiple Data) architecture.

Traditional general purpose processors perform inverse quantization in DV decoding using a very straight-forward but time consuming solution. For instance, in the prior art, the de-quantization coefficient (e.g., Qij) of each pixel element (e.g., Xij) is computed one-by-one, in a serial fashion, and then multiplied by its associated pixel value (e.g., Xij) and the result is stored in the DCT matrix 30. This is done serially for each of the 64 coefficients (X00–X77). That means, for each pixel (e.g., Xij) of the 8×8 block 10, at least one load instruction, one store instruction and one multiply (or shift) instruction are needed. This does not even include the time required to create the quantization coefficients (Qij) for each pixel (Xij) which are obtained from macroblock and block parameters. Therefore, using the conventional approach described above, it takes the general purpose processor more than 200 instructions to completely process one 8×8 data block 10 through inverse quantization to create the DCT matrix 30.

Considering that DV decoding should be done in real-time to avoid image jitter and other forms of visual and/or audio artifacts with respect to the AV material, what is desired is a more efficient mechanism and method for performing inverse quantization to produce a DCT matrix 30 within a DV decoder.

SUMMARY OF THE INVENTION

Accordingly, the present invention provides a more efficient mechanism and method for performing inverse quantization within a DV decoder to produce a DCT matrix. The present invention performs up to eight multiply instructions in parallel for multiplying eight pixels (X) against eight quantization coefficients (Q) to simultaneously produce eight DCT coefficients using, in one embodiment, a 64-bit SIMD type media instruction set (and architecture) and a special quantization matrix. In another embodiment, a 128-bit SIMD type media instruction set (and architecture) can be used.

An efficient digital video (DV) decoder process is described herein that utilizes a specially constructed quantization matrix allowing an inverse quantization subprocess to perform parallel computations, e.g., using SIMD (Single Instruction Multiple Data) processing, to efficiently produce a matrix of DCT coefficients. The inverse quantization subprocess efficiently produces a matrix of DCT (Discrete Cosine Transform) coefficients. The present invention can take advantage of the SIMD architecture because it generates a vector containing the desired values which can then be processed in parallel. In the inverse quantization process of DV decoding, obtaining the quantization scale vectors is complex. One embodiment of the present invention utilizes 15 pre-defined quantization scales (a vector, also called herein an "array") to dynamically build an 8×8 quantization matrix using one shift instruction for each row of the matrix. Therefore, one load instruction and seven shift instructions are needed for obtaining an 8×8 quantization matrix for an 8×8 pixel block.

The present invention utilizes a first look-up table (for 8×8 DCT mode) which produces a 15-valued array based on class number information, area number information and a quantization (QNO) number for an 8×8 data block ("data matrix" or "pixel block") from the header information decoded from the encoded digital bitstream. The 8×8 data block is produced from a variable length decoding and inverse scan subprocess. An individual 8-valued segment of the 15-value array is multiplied by an individual 8-valued segment, e.g., "a row," of the 8×8 data matrix to produce an individual row of the 8×8 matrix of DCT coefficients ("DCT matrix"). The above eight multiplications can be performed in parallel using a SIMD architecture to simultaneously generate the row of eight DCT coefficients. In this way, eight passes through the 8×8 data block are used to produce the entire 8×8 DCT matrix; in one embodiment this consumes only 33 instructions per 8×8 data block. After each pass, the 15-valued array is shifted by one value to update its quantization coefficients for proper alignment with its associated row of the data block. This continues until all rows of the data block are processed. The DCT matrix is then processed by an inverse discrete cosine transformation subprocess that generates decoded display data. A second lookup table can be used for 2×4×8 DCT mode processing.

One embodiment of the present invention is applied for the software DV decoder on a microprocessor with 128-bit registers and a multi-media instruction set. This instruction set includes an instruction to multiply 8 16-bit values from one register with 8 16-bit values from the other register to simultaneously produce 8 results and shifting two concatenating registers (256-bit) together for certain bytes. By using these media instructions and 128-bit wide bandwidth, not only are the execution cycles reduced by the present invention, but the memory access latency for the quantization matrix is also reduced to one access. In this implementation, 33 instructions are used to de-quantize one 8×8 block for both 8×8 DCT mode and for 2×4×8 DCT mode.

In an alternate embodiment of the present invention, a 64-bit SIMD architecture can also be used. Within the 64-bit SIMD instructions, two multiplication instructions can be applied for each row of the 8×8 matrix. Therefore, cycles spent on multiplication are doubled compared to the 128-bit SIMD embodiment. However, the generation of the quantization matrix is analogous to the 128-bit SIMD embodiment.

More specifically, embodiments of the present invention includes, in a digital DV decoding process, a method of performing de-quantization comprising the steps of: a) obtaining a multi-valued array of quantization coefficients by referencing memory stored information with class information and a quantization number that are associated with a block of data coefficients representing encoded information; b) multiplying data coefficients of a respective row of the block of data coefficients with quantization coefficients of a designated portion of the multi-valued array in parallel to simultaneously produce a respective row of coefficients within a discrete cosine transform (DCT) matrix; c) shifting the multi-valued array by one value to update quantization coefficients of the designated portion; and d) completing the DCT matrix by repeating steps b)–c) for all rows of the block of data coefficients. Embodiments include the above and wherein the multi-valued array comprises 15 quantization coefficients and wherein the respective row of the block comprises eight data coefficients and wherein the designated portion of the multi-valued array comprises eight quantization coefficients and wherein the step b) comprises the step of producing eight DCT coefficients in parallel by simultaneously multiplying said eight data coefficients by said eight quantization coefficients.

BRIEF DESCRIPTION OF THE DRAWINGS

FIG. 4A illustrates a table defining class number for each DCT (Discrete Cosine Transform) block within the input DV-encoded digital bitstream.

FIG. 4B illustrates an example of the classification for a DCT block with maximum absolute value of the AC coefficients.

FIG. 5A illustrates the area number of each pixel corresponding to its real position in an 8×8 matrix (for 8×8 DCT mode), the area numbers are needed to find the quantization values from a predefind table.

FIG. 5B illustrates the area number of each pixel corresponding to its real position in an 8×8 matrix for 2×4×8 DCT mode.

FIG. 6 is a table outlining a quantization step that depends on class number, area number and quantization number (QNO).

FIG. 8 is a first memory stored look-up table (LUT) used in accordance with an embodiment of the present invention for determining the proper efficient quantization matrix for 8×8 DCT mode decoding.

FIG. 9 is a second memory stored LUT used in accordance with an embodiment of the present invention for determining the proper efficient quantization matrix for 2×4×8 DCT mode decoding.

FIG. 12A illustrates the arrangement of a video segment after bit rate reduction.

DETAILED DESCRIPTION OF THE INVENTION

In the following detailed description of the present invention, an efficient digital video (DV) decoder unit that utilizes a dynamically constructed quantization matrix that allows parallel computations to be performed, e.g., using SIMD processing, for inverse quantization to efficiently produce a matrix of DCT coefficients, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

One embodiment of the present invention is applied on the software DV decoder on a microprocessor with 128-bit registers and a multi-media instruction set. This instruction set includes an instruction to multiply 8 16-bit values from one register with 8 16-bit values from the other register to simultaneously produce 8 results as described in co-pending United States Patent Application entitled, "A High Performance Universal Multiplier Circuit," filed on Oct. 8, 1999, now U.S. Pat. No. 6,353,843 B1, by F. Chehrazi, V. Oklobdzija and A. Farooqui, which is incorporated herein by reference.

Figure 1:
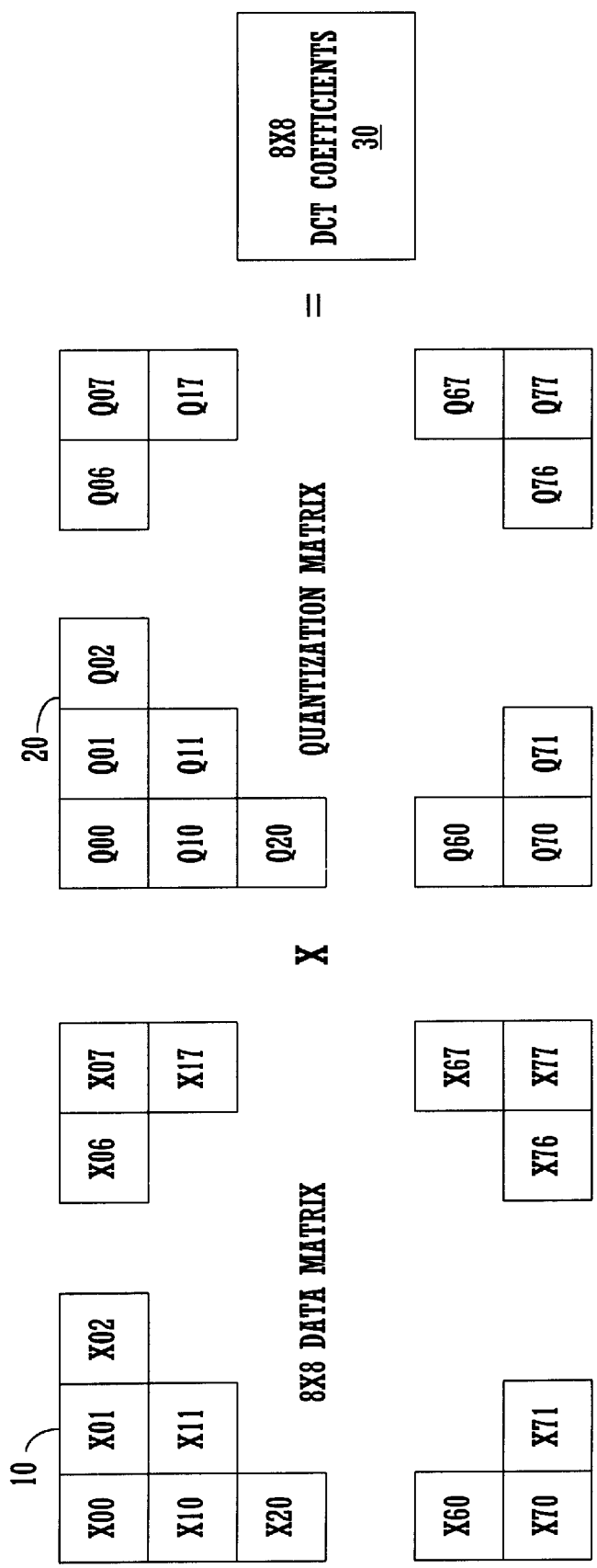
FIG. 1 illustrates a de-quantization process used in the DV (Digital Video) decoding standard whereby each element in a data matrix is multiplied by the corresponding element in a quantization matrix to produce a DCT matrix of coefficients.
Figure 2:
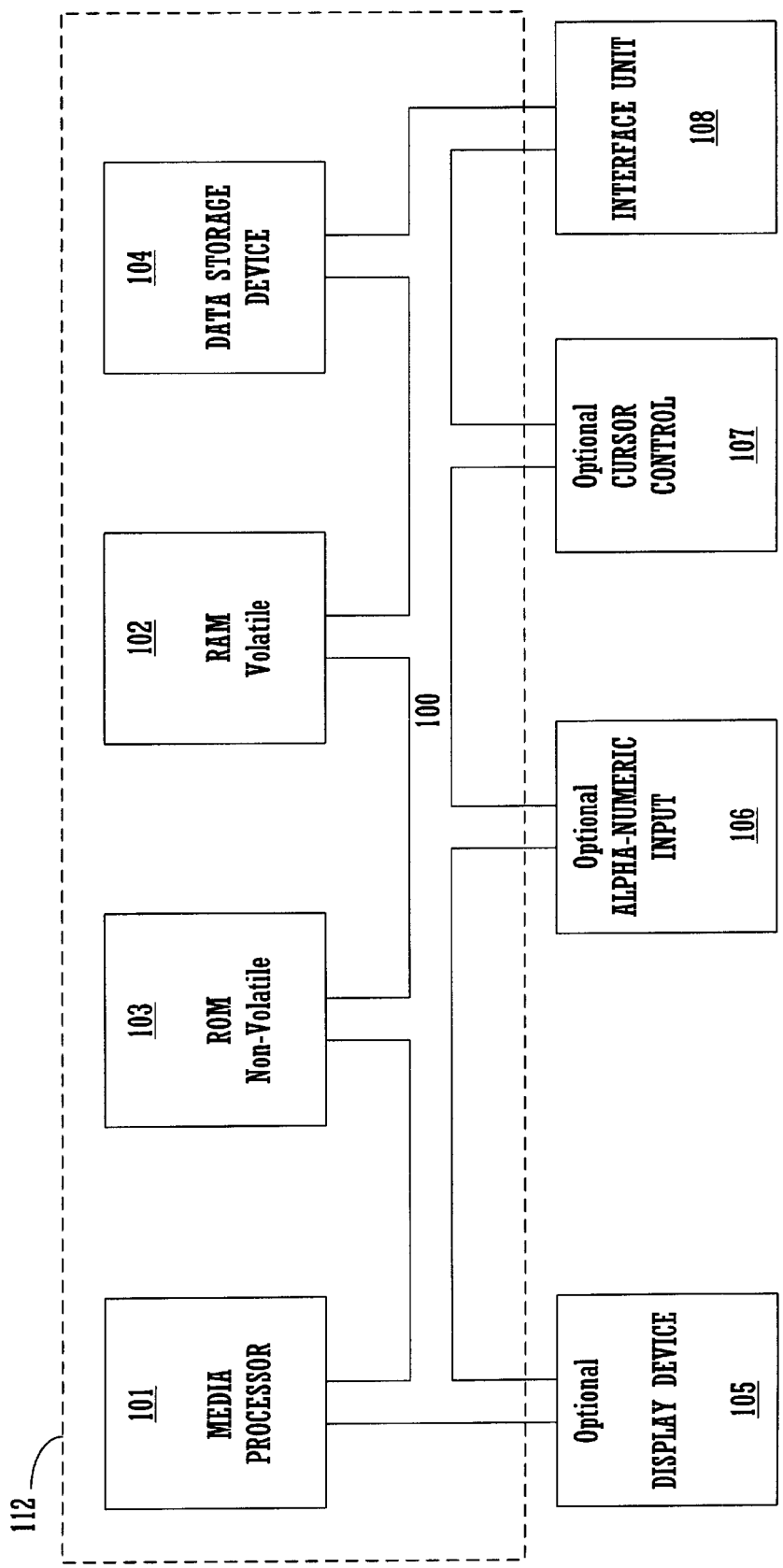
FIG. 2 is a block diagram of a general purpose computer system that can be used as a platform for implementing efficient de-quantization processes in accordance with embodiments of the present invention.

FIG. 2 illustrates a computer system (general purpose or embedded) having a media processor 101 for implementing a DV decoder in accordance with one embodiment of the present invention. It is appreciated that the DV decoder unit can be realized in hardware as a device and can also be realized as a software process executed by processor 101. The DV decoder unit is used to decode a DV-encoded bit stream to produce decoded AV material within computer controlled system 112. Host computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user. System 112 can also be referred to as an embedded system. System 112 can also include an interface unit 108.

Also included in computer system 112 of FIG. 2 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. DV decoder unit is coupled to the bus 100 and is for decoding multi-media content for rendering on device 105, for instance. The display device 105 utilized with the computer system 112 is optional and may be a liquid crystal device, cathode ray tube (CRT), field emission device (FED, also called flat panel CRT) or other display device suitable for creating graphic images and alphanumeric characters recognizable to the user.

Figure 3A:
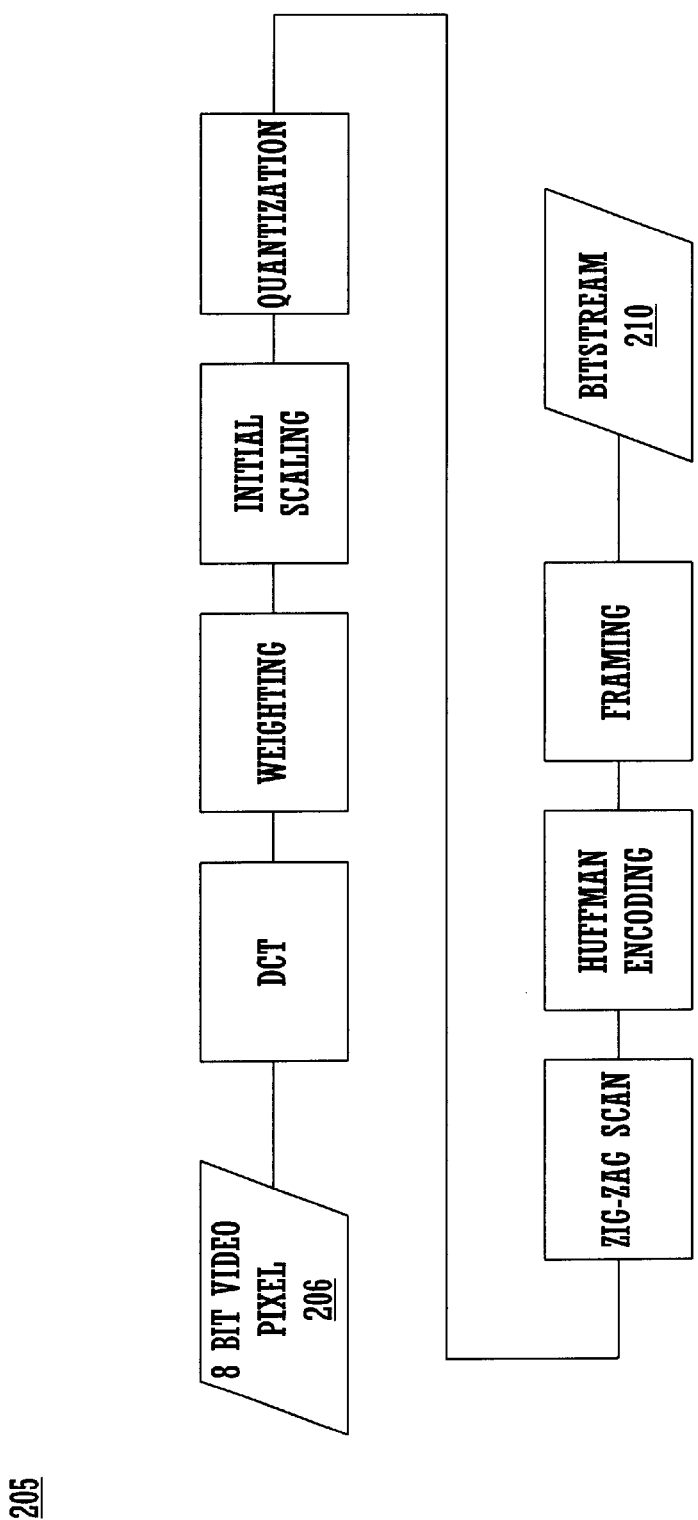
FIG. 3A illustrates a DV encoding process.

FIG. 3A illustrates a data flow diagram of a DV encoding process 205. Video pixels 206 first enter a DCT process, followed by a weighting process then an initial scaling process is performed. Then, a quantization process is performed and a zig-zag process is performed followed by a huffman encoding process. Framing is then performed to generate an encoded digital bitstream 210.

Figure 3B:
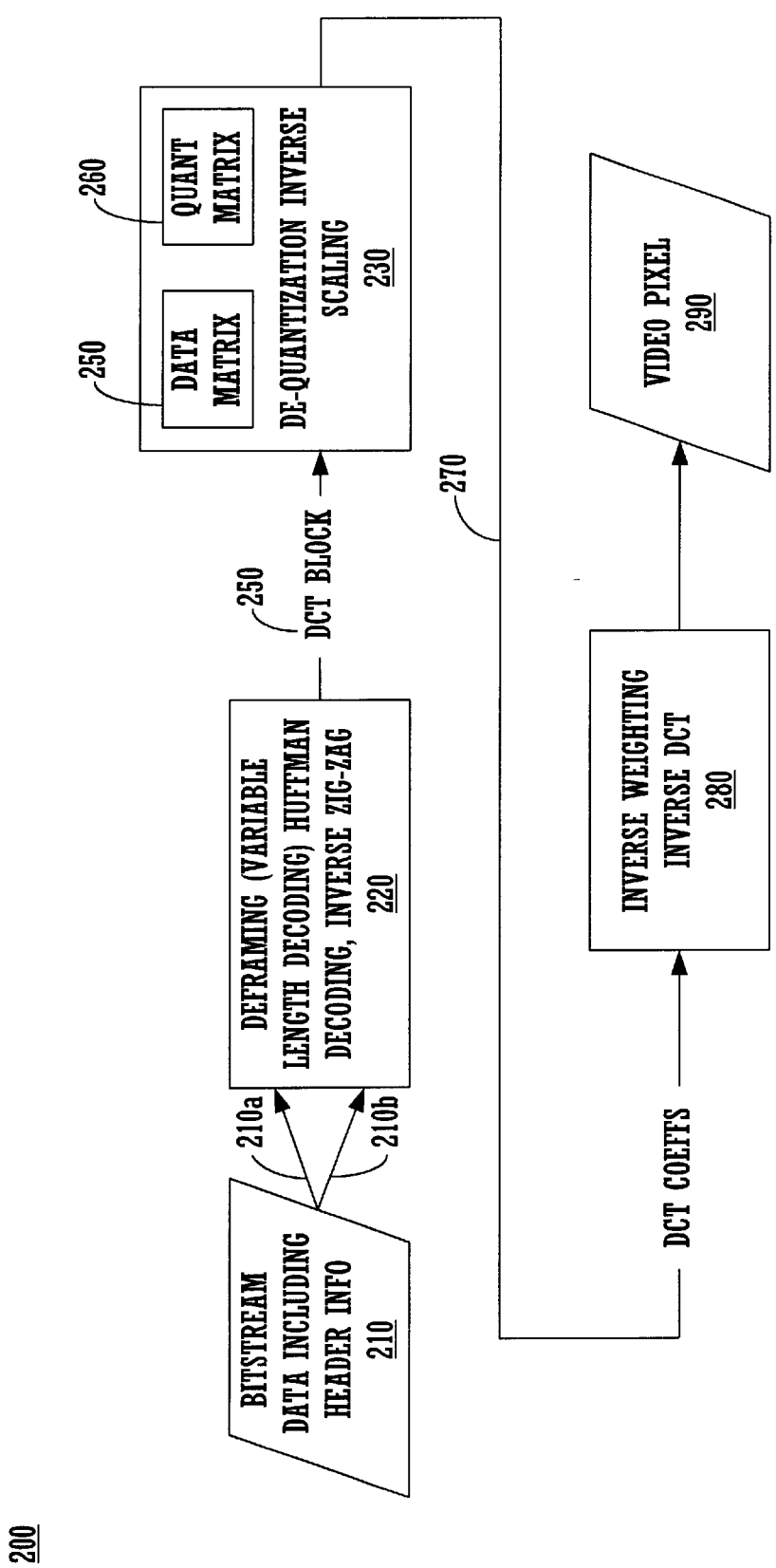
FIG. 3B is a data flow diagram of a DV decoding process in accordance with one embodiment of the present invention and includes the efficient de-quantization subprocess of the present invention.

FIG. 3B illustrates a data flow diagram 200 of a digital video (DV) decoding process in accordance with one embodiment of the present invention. An input bit stream of DV-encoded data 210 is received by a deframing and variable length decoding subprocess 220. The encoded bit stream includes bitstream data 210a combined with header information 210b. The header information 210b is used by the decoding processes to properly decode the associated bit stream data 210a and includes class information, area information and a quantization number (QNO) among other information. The DV deframing and variable length decoding processes 220 are compliant with the DV specification and are well known.

Figure 7:
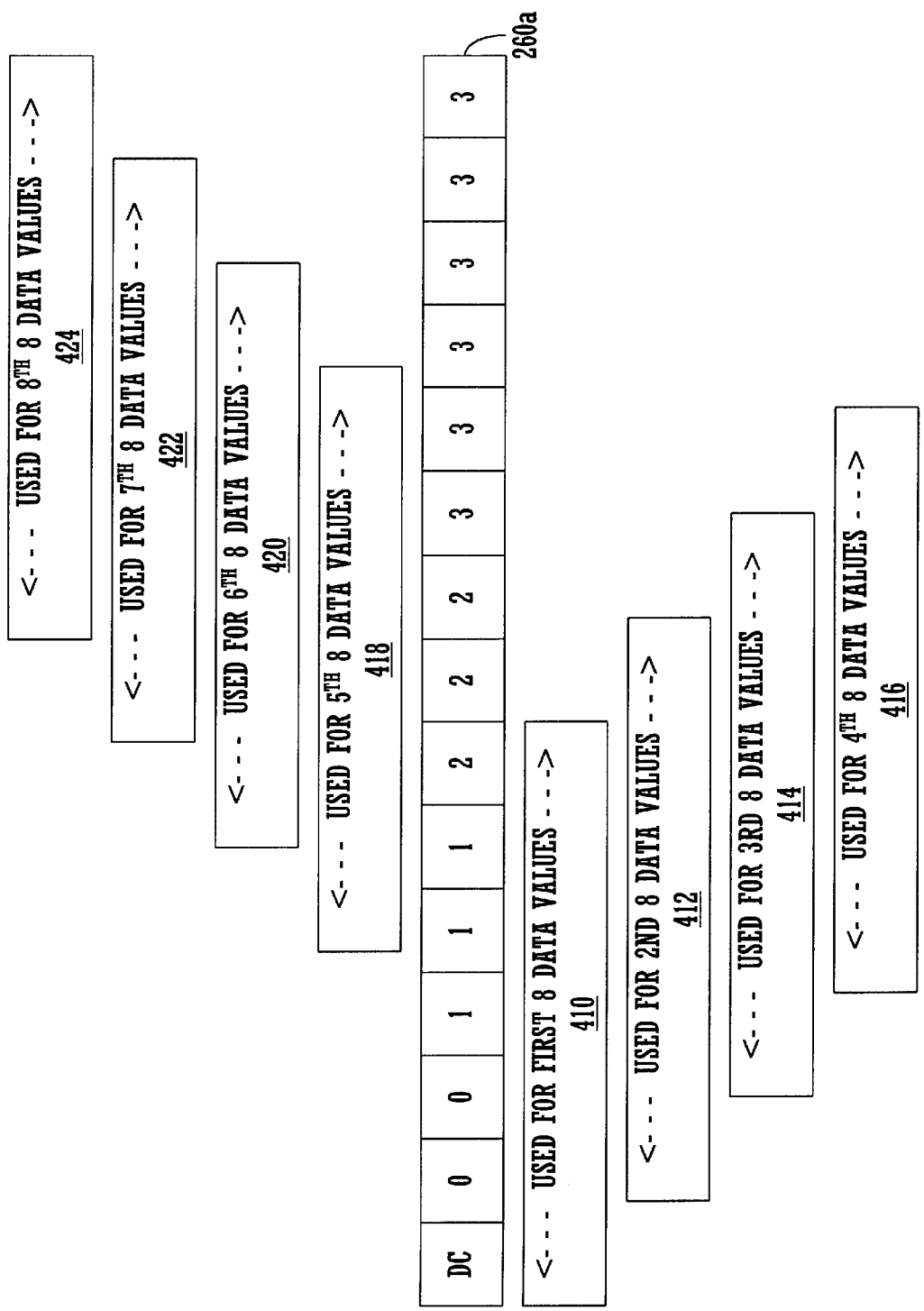
FIG. 7 illustrates an efficient quantization matrix that is dynamically constructed using logical shifting of a multi-valued quantization array in accordance with an embodiment of the present invention.

The output of the deframing subprocess 220 is a data matrix 250 of "X" coefficients. In one embodiment, the output 250 is an 8×8 data block containing 64 X coefficients. Because the inverse zig-zag scan can be done along with Huffman decoding, in one embodiment the coefficients from the variable length decoding subprocess 220 can be arranged as an 8×8 matrix 250. The data block 250 is received by an inverse quantization subprocess 230 which is also called a "de-quantization" subprocess herein. In one embodiment, each coefficient of the input of de-quantization 230 is a 9-bit signed integer (per coefficient), ranging from −256 to 255. Since the class and area information come along with the VLD (variable length decoding) decoded matrix the inverse quantization process 230 of FIG. 3B constructs a new quantization matrix 260 based on this information. As discussed below, the present invention dynamically generates the quantization matrix 260 based on a multi-valued quantization array (FIG. 7). The quantization matrix 260 contains a separate "Q" coefficient "X" coefficient in the data block 250. The "Q" coefficient can also be called a quantization "scale."

The data matrix 250 and the quantization matrix 260 are multiplied together by the inverse quantization subprocess 230 to generate a DCT matrix 270 of coefficients. The output format of de-quantization 230 is a 9-bit signed integer (per coefficient) as well. In one embodiment, if the class number of the DCT block is 3, the AC coefficients are inverse scaled to factor of 2. In this case, the output of de-quantization 230 is a 10-bit signed integer per coefficient. The DCT coefficients 270 are then processed by an inverse DCT subprocess 280 which produces digital decoded display data 290. The digital decoded display data 290 can be displayed on display 105 of system 112 of FIG. 2. Any of a number of well known DV IDCT decoding processes can be used as subprocess 280.

The present invention advantageously utilizes parallel performed computations in the de-quantization subprocess 230 to increase the speed in which DCT coefficients 270 are produced. In one implementation, both the input and output data of the quantization process 230 do not exceed the 16-bit boundary, therefore a single-precision 16-bit multiplication instruction can be used to achieve 8 results at the same time in a SIMD architecture. Using the above SIMD multiplication instruction along with an 8×8 quantization matrix 260, the de-quantization for each 8×8 block can be completed using 8 multiplication instructions in accordance with an embodiment of the present invention. However, since the quantization table for a DV decoder is not a pre-loaded matrix, like an MPEG-2 decoder, the de-quantization process 230 needs to compute the proper quantization matrix for the 8×8 data block 250. According to the present invention, the quantization table 260 is determined dynamically by parameters from macroblock, block, and even pixel position in the 8×8 data block. The present invention generates the quantization table 260 with less instructions and small pre-defined tables.

FIG. 4A illustrates a table 300 of class definitions. To determine the proper values for the quantization matrix 260, de-quantization process obtains the class information and the area information for each 8×8 data block 250. According to the DV encoding standard, each DCT block is classified into four classes by the definitions shown in FIG. 4A. Both "c1" and "c0" express the class number and are stored with the DC coefficient of the compressed DCT block as is known in the DV standard. FIG. 4B illustrates an exemplary classification 310 for chromaticity, "CR and CB" and luminance, "Y," for four different ranges of maximum absolute value of AC coefficients.

Initial scaling is an operation for AC coefficients to transform them from 10 bits to 9 bit during the encoding process according to the DV standard. Initial scaling is done as shown below:

For class number=0, 1, 2:
    input data: s b8 b7 b6 b5 b4 b3 b2 b1 b0
    output data: s b7 b6 b5 b4 b3 b2 b1 b0

For class number=3:
    input data: s b8 b7 b6 b5 b4 b3 b2 b1 b0
    output data: s b8 b7 b6 b5 b4 b3 b2 b1

FIG. 5A illustrates area information assignment 340 for the quantization matrix for the 8×8 DCT mode. FIG. 5B illustrates area information assignment 350 for the quantization matrix for the 2×4×8 DCT mode. The AC coefficients within each DCT block are classified into four areas (0–3) with the area numbers assigned within each DCT block as shown; "DC" indicates a DC coefficient which is not necessary for inverse quantization.

Figure 11:
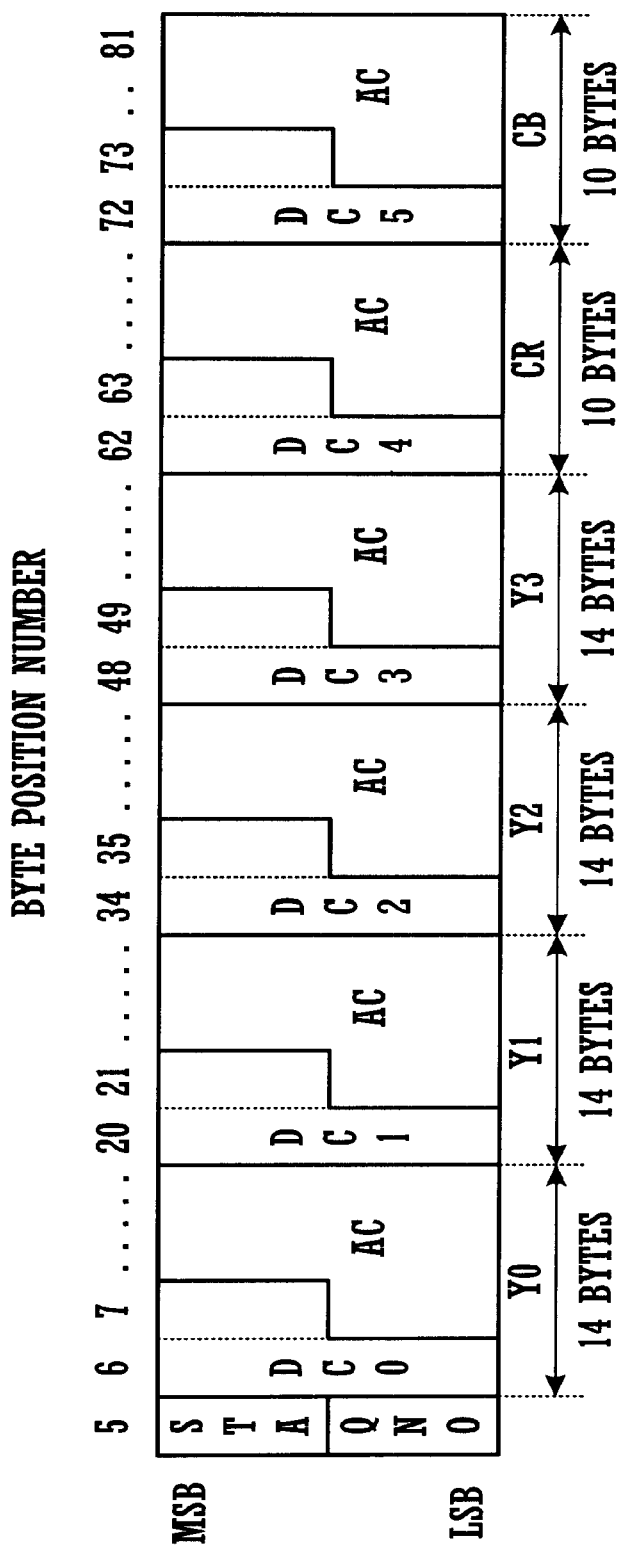
FIG. 11 illustrates an arrangement of a compressed macro block.
Figure 12B:
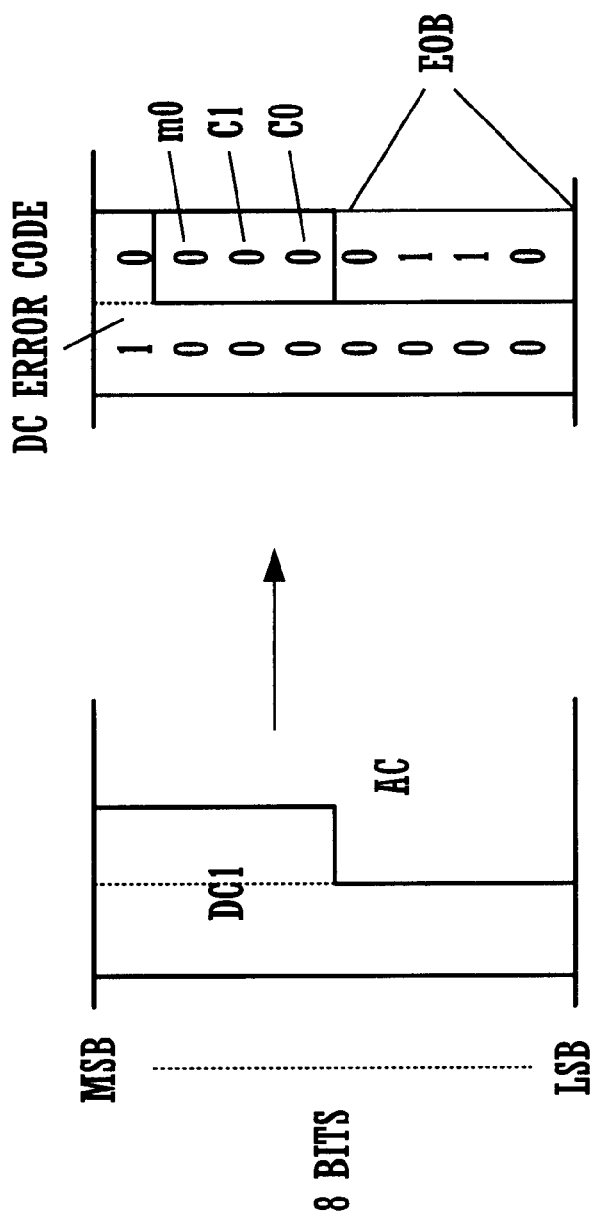
FIG. 12B illustrates the video error code.

FIG. 6 illustrates a table 370 defining the quantization step which is decided by the class number, area number and the quantization number (QNO). The QNO value is obtained from the 4th to 7th bits of 5th byte (see FIG. 11) for each syncblock. The class number is obtained from the 2nd and 3rd bits of 2nd byte (see FIG. 12A and FIG. 12B) for each block. Table 370 along with the area assignments of Table 5A and 5B can be used to generate the proper quantization matrix 260 for each 8×8 data block 250. A QNO is provided for each macroblock and is selected in order to limit the amount of data in one video segment to five compressed macroblocks according to the DV standard.

For instance, for a class number of "2" and a QNO number of "11", then the area assignments for "0", "1", "2", and "3" are "1", "2", "2" and "4", respectively, as shown in row 378a. Therefore, to determine the resultant quantization matrix 260 for these values, these assignments are ordered in the appropriate fashion according to the area values of table of FIG. 5A for 8×8 DCT mode and according to table 5B for 2×4×8 DCT mode. As another example, for a class number of "3" and a QNO number of "2", then the area assignments for "0", "1", "2", and "3" are "4", "8", "8" and "16", respectively as shown in row 378b. Therefore, to determine the resultant quantization matrix 260 for these values, these assignments are ordered in the appropriate fashion according to the area values of table of FIG. 5A for 8×8 DCT mode and according to table 5B for 2×4×8 DCT mode.

It is appreciated that there are four tables for each class. But a unified table can be constructed based on the table for class 2 by adding 6 to the QNO of class 0, or adding 3 to the QNO of class 1 or adding 1 to the QNO of class 3. If the modified QNO is greater or equal to 15, the quantization steps for the whole block will be equal to 1. That means no quantization needs to be done. If the modified QNO is between 0 and 14, the quantization table for 8×8 block can be build based on the quantization step for each area. According to one embodiment of the present invention, the 15 QNO cases can be categorized into 8 cases because of redundancy of the Table of FIG. 6 which are represented as look-up tables stored in computer memory.

Rather than constructing an entire 8×8 quantization matrix, according to the present invention, a 15-valued array 260a (as shown in FIG. 7) is generated instead and appropriately bit shifted in order to simulate rows of the 8×8 quantization matrix. If 8 quantization tables were created in advance, it would take the memory size of 8 (cases)*64 (pixels each block)*2 (short int)*2(DCT modes) which equals 2048 bytes and is too large. Therefore, the present invention avoids the above memory hit-and utilizes the 15-valued array 260a instead to dynamically generate the quantization matrix.

FIG. 7 illustrates the area assignments used by the present invention for this 15-valued quantization array 260a which is generated by the look-up table. Based on the class information and the QNO of the input data block, the area assignments are replaced with their appropriate values according to the table of FIG. 6. By using a 15-valued array that is shifted for each row of the 8×8 data block, the present invention saves both computer memory resources and computation time. For instance, segment 410 (from DC to 2) is used for the first row of 8 data values of the 8×8 data block. Array 260a is then left shifted by one value and segment 412 (from 0 to 2) is used for the second row of 8 data values of the 8×8 data block. Array 260a is then left shifted by one value and segment 414 (from 0 to 3) is used for the third row of 8 data values of the 8×8 data block. This continues until segment 422 is reached and array 260a is finally shifted by one value and segment 424 (from 2 to 3) is used for the eighth row of 8 data values of the 8×8 data block.

As shown in FIG. 6, area assignments are duplicated down the table. For instance, every other area assignment row is duplicated. Therefore, there are only eight different area assignments for any given QNO and class number information for an 8×8 data block. Taking advantage of this duplication and also using the 15-valued array 260a, the present invention provides a look-up table (LUT) 510 shown in FIG. 8 and is used for 8×8 DCT mode. The LUT 510 is stored in computer memory (e.g., memory 102 of FIG. 2) and is used to supply the proper 15-valued array 260a for any given combination of class information and QNO that are possible. Each row of the LUT 510 is a different possible 15-valued array 260a for the 8×8 DCT mode and is used to represent an 8×8 block for each type. For example, the first row indicates quantization scales for the first case and modified QNO number equals to 0 and 1 as {Q0, Q0, Q0, Q1, Q1, Q1, Q2, Q2, Q2, Q3, Q3, Q3, Q3, Q3, Q3, NULL}. Each value is a 16-bit signed integer. As an example, for a class number of "2" and a QNO of "12", the output array of the LUT 510 would be:

1, 1, 1, 1, 1, 1, 2, 2, 2, 2, 2, 2, 2, 2, 2, NULL

The above array can then be used to dynamically generate the required quantization matrix according to the diagram of FIG. 7. And for a class number of "3" and a QNO of "0", the output array of the LUT 510 would be:

8, 8, 8, 8, 8, 8, 16, 16, 16, 16, 16, 16, 16, 16, 16, NULL

The above array can then be used to dynamically generate the required quantization matrix according to the diagram of FIG. 7.

Figure 10:
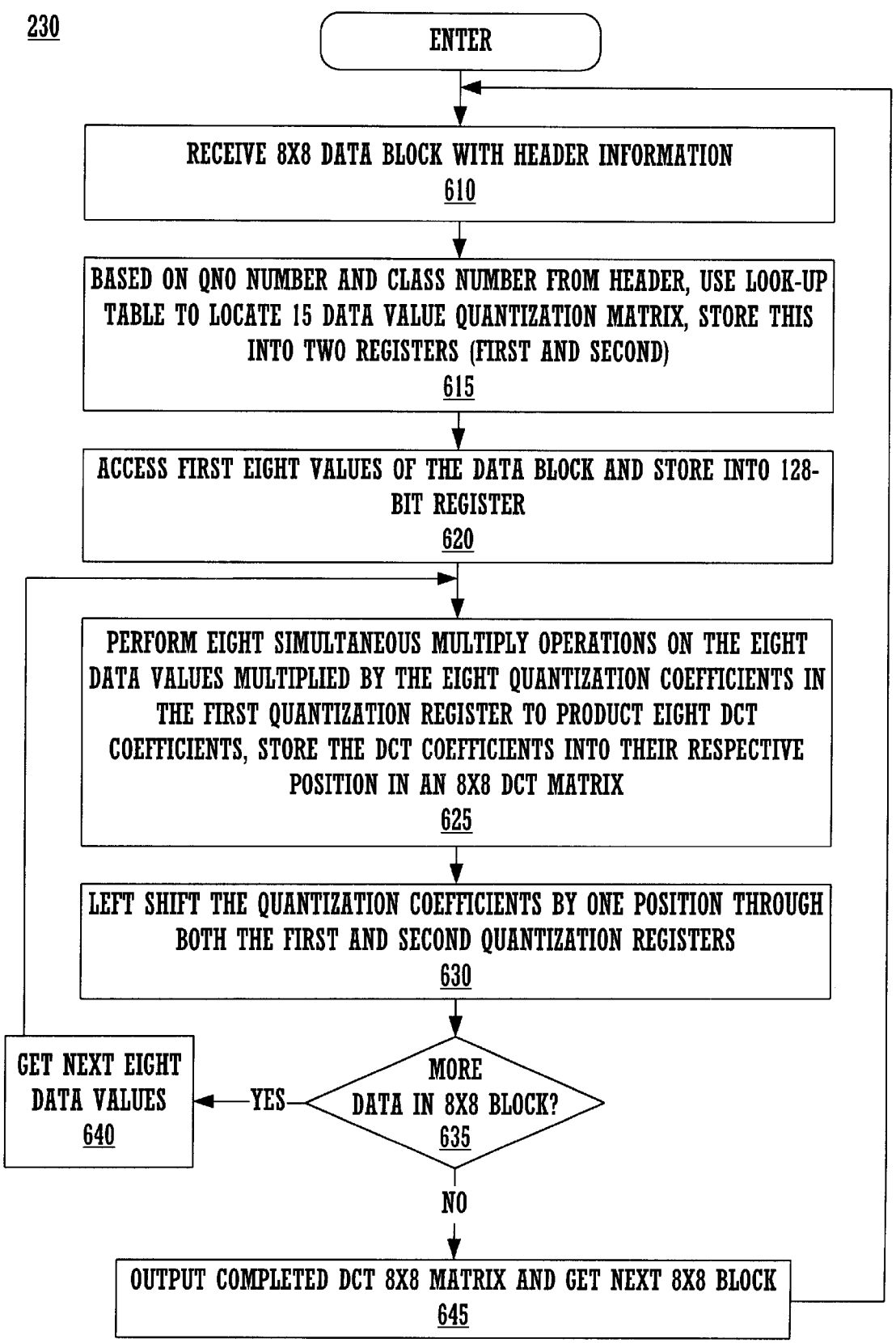
FIG. 10 is a flow diagram of steps used by an embodiment of the present invention for performing efficient de-quantization within a DV decoding process.

FIG. 10 illustrates the steps of the de-quantization sub-process 230 of the present invention in more detail and illustrates the manner in which the 15-valued array 260a is used with an 8×8 matrix. At step 610 an 8×8 data block is received along with its associated class information, area information (which is implied by the DCT mode) and QNO value. At step 615, based on class information and the QNO, LUT 510 is used to located the 15-valued array 260a which is used by the present invention to dynamically construct, over multiple passes, a quantization matrix 260 for 8×8 DCT mode. This array is stored in two registers (first and second) of microprocessor 101 (FIG. 2) in one implementation of the present invention. The first eight values of the array 260a are stored in the first register and the remaining seven values are stored in the second register in this implementation.

At step 620, the first eight data values, e.g., the first row, of the 8×8 data matrix 250 are obtained and stored in a third register, e.g., a 128-bit register in one implementation. At step 625, the eight values of the third register are simultaneously multiplied by the eight values of the first register to simultaneously produce eight DCT coefficients which are stored in a corresponding row of the 8×8 DCT matrix 270. This can be accomplished in one embodiment using the multiplier described in co-pending United States patent application entitled, "A High Performance Universal Multiplier Circuit," filed on Oct. 8, 1999, now U.S. Pat. No. 6,353,843 B1, by F. Chehrazi, V. Oklobdzija and A. Farooqui.

At step 630 of FIG. 10, the 15-valued array is left shifted by one value so that the first register goes from containing the first to the eighth quantization coefficients to containing the second through ninth quantization coefficients. For the first row of an 8×8 matrix, the 8 quantization scales are the first 8 Q values in the 15-valued array 260*a*. For the second row of the 8×8 matrix, the 8 quantization scales are second Q value through the 9th Q value in the 15-valued array 260*a* and so on. For the 8th row of the 8×8 matrix, the quantization scales will be the 8th Q value through the 15th Q value. Step 635 checks if all rows of the current 8×8 data block have been fully processed and if not, step 640 selects the next row and step 625 is entered again to perform another parallel multiply operation. At step 635, if the current 8×8 data block is fully processed, then at step 645, the newly generated DCT matrix 270 is output to the IDCT process 280 (FIG. 3B) and then step 610 is entered to process another 8×8 data block.

Following is an exemplary SIMD implementation for 8×8 DCT mode.

```
LDMW (q_scale, q_table_ 8 × 8 [q_comp>>1]) ;
for (line = 0; line < 8 ; line ++ )   {
    LMW (vld_coeff) ;
    MULL (dg_coeff, vld_coeff, q_scale)
    SMW (dg_coeff) ;
    SHPL (q_scale, q_scale, 2) ;
    vld_coeff + = 8 ;
    dq_coeff += 8 ;
}
```

The instruction LDMW can load one row of quantization table into 2 128-bit wide registers at one cycle. By using SHPL instruction, one 16-bit quantization scale can be left shifted to generate the quantization scale vector for the next row. Therefore, only 4 instructions are needed in order to finish one row of 8×8 block.

Because the area numbers for 8×8 DCT mode and 2×4×8 DCT mode are different, they are processed separately using separate LUTs. For the 2×4×8 DCT mode, the quantization table is different because the area number arrangement are different. FIG. 9 illustrates an analogous LUT 520 for use with the 2×4×8 DCT mode. LUT 520 is stored in computer memory (e.g., memory 102 of FIG. 2). It is appreciated that the area assignments of FIG. 5B are not as uniform as the area assignments of FIG. 5A. However, the present invention still applies the analogous method as the 8×8 mode (FIG. 10) but then performs some corrections. Therefore, the LUT 520 makes two approximations which require a back-end correction for the 2×4×8 DCT mode. In fact, corrections are needed for only two pixels which are the fifth pixel of first row and the fourth pixel of the 8th row. This back-end correction is shown in the exemplary implementation of the 2×4×8 DCT mode in the section below.

An exemplary SIMD implementation for 2×4×8 DCT mode is described in the following.

```
q_scale = LDMW_HW_EMMP
    (q_table_2 × 4 × 8 [q_comp>>1] );
for (line = 0 ; line < 4 ; line ++ )    {
    vld_line0 = LMW_HW_EMMP ( vld_coeff ) ;
    vld_line1 = LMW_HW_EMMP ( vld_coeff + 64 ) ;
    dq_line0 = MULL_HW_EMMP (vld_line0, q_scale) ;
    dq_line1 = MULL_HW_EMMP (vld_line1, q_scale) ;
    SMW_HW_EMMP (dq_line0, dq_coeff ) ;
    SMW_HW_EMMP (dq_line1, dq_coeff + 64 ) ;
    SHPL_HW_EMMP (q_scale, q_scale, 2 ) ;
    vld_coeff += 8 ;
    dq_coeff += 8 ;
}
/ * Re-correct pixel   ( 0, 4 )  */
data–> quantized [block_no] [ 4 ] >> = 1;
/ * Re-correct pixel ( 7, 3 )  */
data–> quantized [block_no] [ 59 ] << = 1;
```

Therefore, the instructions for quantization of 2×4×8 DCT mode equal to those of 8×8 DCT mode plus instruction used for two pixel corrections.

Table I (shown below) illustrates one performance estimation of an example de-quantization subprocess in accordance with one embodiment of the present invention for performing DV decoding.

TABLE I

| | SIMD implementation |
|---|---|
| 8 × 8 DCT Mode | 33 instructions per 8 × 8 data block |
| 2 × 4 × 8 DCT Mode | 33 instructions per 8 × 8 data block |
| Estimated Time Per Frame (ms) | 0.985 ms |

According to the example implementations shown above, there is no if statement and the for loop can be removed by unrolling. By using the special arrangement of the quantization table of the present invention, only two instructions (excluding load and store) are needed for one row in a 8×8 data block.

EXEMPLARY IMPLEMENTATION

Although the de-quantization process of the DV decoding process of the present invention can be implemented using a number of different computer programming languages and techniques, one exemplary implementation is shown below. It is appreciated that the following implementation is illustrated as an example only and should not be construed as limiting the present invention to any particular programming language or computer programming platform.

```
/*=========================================================
dequantize_emmp.c
Dequantization module for DV decoder.
Reduces the instruction count and minimizes the memory for
quantization table.
Assumption :
    Inverse zig-zag scan has been done in VLD module.
```

```
q_table format :
    {q0,q0,q0,q1,q1,q1,q2,q2,q2,q3,q3,q3,q3,q3,q3, NULL }
where i in qi means area number.
EMMP instructions used:
    LDMW, LMW, SHPL, MULL, SMW, SHL
================================================================ */
#define     Q_TYPES             8
#define     MAX_QLEVELS         15
#define     NULL                0
typedef HALFWORD short int;
HALFWORD q_table_8 x 8 [Q_TYPES] [16] = {
    8, 8, 8, 8, 8, 8, 16, 16, 16, 16, 16, 16, 16, 16, 16, NULL,
    4, 4, 4, 8, 8, 8, 8,  8,  8, 16, 16, 16, 16, 16, 16, NULL,
    4, 4, 4, 4, 4, 4, 8,  8,  8,  8,  8,  8,  8,  8,  8, NULL,
    2, 2, 2, 4, 4, 4, 4,  4,  8,  8,  8,  8,  8,  8,  8, NULL,
    2, 2, 2, 2, 2, 2, 4,  4,  4,  4,  4,  4,  4,  4,  4, NULL,
    1, 1, 1, 2, 2, 2, 2,  2,  2,  4,  4,  4,  4,  4,  4, NULL,
    1, 1, 1, 1, 1, 1, 2,  2,  2,  2,  2,  2,  2,  2,  2, NULL,
    1, 1, 1, 1, 1, 1, 1,  1,  1,  2,  2,  2,  2,  2, NULL   };
HALFWORD q_table_ 2 x 4 x 8 [Q_TYPES] [16] = {
    8, 8, 8, 8, 16, 16, 16, 16, 16, 16, 16, NULL, NULL, NULL, NULL, NULL,
    4, 4, 8, 8,  8,  8,  8, 16, 16, 16, 16, NULL, NULL, NULL, NULL, NULL,
    4, 4, 4, 4,  8,  8,  8,  8,  8,  8,  8, NULL, NULL, NULL, NULL, NULL,
    2, 2, 4, 4,  4,  4,  4,  8,  8,  8,  8, NULL, NULL, NULL, NULL, NULL,
    2, 2, 2, 2,  4,  4,  4,  4,  4,  4,  4, NULL, NULL, NULL, NULL, NULL,
    1, 1, 2, 2,  2,  2,  4,  4,  4,  4,  4, NULL, NULL, NULL, NULL, NULL,
    1, 1, 1, 1,  2,  2,  2,  2,  2,  2,  2, NULL, NULL, NULL, NULL, NULL,
    1, 1, 1, 1,  1,  1,  1,  2,  2,  2,  2, NULL, NULL, NULL, NULL, NULL,  };
void dequantize    (CoderData    *data, int mb, int block_no)
{
    HALFWORD q_scale [16];
    q_comp = data->qLevel [mb] + activityTable[data ->
activityBits [blockn] ] ;
    /* if q_comp >= MAX_QLEVELS, only initial scaling
has to be done    */
        if (q_comp < MAX_QLEVELS)       {
            vld_coeff = data ->quantized[blockn];
            dq_coeff = data->outcoef;
            motion = data ->motionBits[blockn ;
            act = data ->activityBits[blockn];
            /*---  8 x 8   IDCT mode ---*/
            if (!motion)        {
                LDMW (q_scale, q_table[q_comp>>1] ) ;
        for (line = 0; line < 8 ; line < 8; line++)    {
            vld_line0 = LMW_HW_EMMP (vld_coeff);
            dq_line0 = MUFF_HW_EMMP (vld_line0, q_scale);
            SMW (dq_line0, dq_coeff);
            SHPL_HW_EMMP (q_scale, q_scale, 2);
            vld_coeff += 8;
            dq_coeff += 8;
        }
    }
/*--- 2 x 4 x 8 IDCT mode ---*/
else    {
        q_scale = LDMW_HW_EMMP(q_table_2 x 4 x 8 [q_comp>>1] );
        for    (line = 0; line < 4; line++ )    {
            vld_line0 = LMW_HW_EMMP (vld_coeff);
            vld_line1 = LMW_HW_EMMP (vld_coeff+64 );
            dq_line0 = MULL_HW_EMMP (vld_line0, q_scale);
            dq_line1 = MULL_HW_EMMP (vld_line1, q_scale);
            SMW_HW_EMMP (dq_line0, dq_coeff);
            SMW_HW_EMMP (dq_line1, da_coeff+64);
            SHPL_HW_EMMP (q_scale, q_scale, 2);
            vld_coeff += 8;
            dq_coeff += 8;
        }
        /* Re-correct pixel (0, 4) to compensate for quantization
table uniformity assumption*/
        data->quantized [block_no] [4]   >>= 1;
        }
    }
}
/*--- Inverse initialize scaling --- */
if  (act ==3)    {
    for     (line = 0; line < 8; line ++)        {
        dq_line0 = LMW (dq_coeff);
        dq_line0 = SHL_HW_EMMP (dq_line0, 1);
```

-continued

```
        SMW_HW_EMMP ( dq_line0, dq_coeff);
        dq_coeff   +=  8;
      }
    }
}
```

The preferred embodiment of the present invention, an efficient digital video (DV) decoder unit that utilizes a dynamically constructed quantization matrix that allows parallel computations to be performed, e.g., using SIMD processing, for inverse quantization to efficiently produce a matrix of DCT coefficients, is thus described. While the present invention has been described in particular embodiments, it should be appreciated that the present invention should not be construed as limited by such embodiments, but rather construed according to the below claims.

What is claimed is:

1. In a digital decoding process, a method of performing de-quantization comprising the steps of:
   a) obtaining a multi-valued array of quantization coefficients by referencing memory stored information with class information and a quantization number that are associated with a block of data coefficients representing encoded information;
   b) multiplying data coefficients of a respective row of said block of data coefficients with quantization coefficients of a designated portion of said multi-valued array in parallel to simultaneously produce a respective row of coefficients within a discrete cosine transform (DCT) matrix;
   c) shifting said multi-valued array by one value to update quantization coefficients of said designated portion; and
   d) completing said DCT matrix by repeating steps b)–c) for all rows of said block of data coefficients.

2. A method as described in claim 1 wherein said memory stored information is a look-up table referenced by said class information and said quantization number.

3. A method as described in claim 1 wherein said multi-valued array comprises 15 quantization coefficients.

4. A method as described in claim 3 wherein said respective row of said block comprises eight data coefficients and wherein said designated portion of said multi-valued array comprises eight quantization coefficients and wherein said step b) comprises the step of producing eight DCT coefficients in parallel by simultaneously multiplying said eight data coefficients by said eight quantization coefficients.

5. A method as described in claim 1 wherein said step b) is performed by a parallel multiplier circuit.

6. A method as described in claim 1 wherein said block of data coefficients comprises a matrix of 8×8 data coefficients and wherein said encoded information represents audio/visual material.

7. A method as described in claim 1 wherein said block of data coefficients is encoded using an encoding standard substantially compliant with the Digital Video (DV) encoding standard.

8. A digital decoding process comprising the steps of:
   a) performing deframing and variable length decoding on an encoded bitstream to produce a block of data coefficients;
   b) performing de-quantization on said block of data coefficients to produce a discrete cosine transform (DCT) matrix, wherein step b) comprises the steps of:
      b1) obtaining a multi-valued array of quantization coefficients based on class information and a quantization number that are associated with said block of data coefficients;
      b2) multiplying data coefficients of a respective row of said block of data coefficients with quantization coefficients of a designated portion of said multi-valued array in parallel to simultaneously produce a respective row of coefficients within a discrete cosine transform (DCT) matrix;
      b3) shifting said multi-valued array by one value to update quantization coefficients of said designated portion; and
      b4) completing said DCT matrix by repeating steps b2)–b3) for all rows of said block; and
   c) performing inverse discrete cosine transformation on said DCT matrix to provide decoded image data.

9. A method as described in claim 8 wherein said step b1) comprises the step of accessing a memory stored look-up table using said class information and said quantization number to obtain said multi-valued array of quantization coefficients.

10. A method as described in claim 8 wherein said multi-valued array comprises 15 quantization coefficients.

11. A method as described in claim 10 wherein said respective row of said block comprises eight data coefficients and wherein said designated portion of said multi-valued array comprises eight quantization coefficients and wherein said step b2) comprises the step of producing eight DCT coefficients in parallel by simultaneously multiplying said eight data coefficients by said eight quantization coefficients.

12. A method as described in claim 8 wherein said step of b2) is performed by a parallel multiplier circuit.

13. A method as described in claim 8 wherein said block of data coefficients comprises a matrix of 8×8 data coefficients and wherein said encoded bitstream represents audio/visual material.

14. A method as described in claim 8 wherein said block of data coefficients is encoded using an encoding standard substantially compliant with the Digital Video (DV) encoding standard.

15. A computer system comprising:
   a processor coupled to a bus; and
   a memory unit coupled to said bus and containing instructions that when executed implement a method of performing de-quantization comprising the steps of:
      a) obtaining a multi-valued array of quantization coefficients by referencing memory stored information with class information and a quantization number that are associated with a block of data coefficients representing encoded information;
      b) multiplying data coefficients of a respective row of said block of data coefficients with quantization coefficients of a designated portion of said multi-valued array in parallel to simultaneously produce a respective row of coefficients within a discrete cosine transform (DCT) matrix;

c) shifting said multi-valued array by one value to update quantization coefficients of said designated portion; and d) completing said DCT matrix by repeating steps b)–c) for all rows of said block of data coefficients.

16. A computer system as described in claim 15 wherein step a) comprises the step of accessing a memory stored look-up table using said class information and said quantization number to obtain said multi-valued array of quantization coefficients.

17. A computer system as described in claim 15 wherein said multi-valued array comprises 15 quantization coefficients.

18. A computer system as described in claim 17 wherein said respective row of said block comprises eight data coefficients and wherein said designated portion of said multi-valued array comprises eight quantization coefficients and wherein said step b) comprises the step of producing eight DCT coefficients in parallel by simultaneously multiplying said eight data coefficients by said eight quantization coefficients.

19. A computer system as described in claim 15 wherein said block of data coefficients comprises a matrix of 8×8 data coefficients and wherein said encoded information represents audio/visual material.

20. A computer system as described in claim 15 wherein said block of data coefficients is encoded using an encoding standard substantially compliant with the Digital Video (DV) encoding standard.

* * * * *